US005465533A

United States Patent [19]
Rummo, Jr. et al.

[11] Patent Number: 5,465,533
[45] Date of Patent: Nov. 14, 1995

[54] MODULAR ROOF CURB ASSEMBLY CONSTRUCTION AND INTERLOCKING JOINT MEANS THEREFOR

[76] Inventors: Richard J. Rummo, Jr., 31 S. Hampton Rd., Amesbury, Mass. 01913; Stephen M. Petro, 19 Midlake St., Haverhill, Mass. 01830; John S. Desmond, 123 Farmers Cliff Rd., Concord, Mass. 01742

[21] Appl. No.: 132,833

[22] Filed: Oct. 7, 1993

[51] Int. Cl.⁶ ............................................ F16M 3/00
[52] U.S. Cl. .................. 52/60; 248/676; 403/294; 403/231; 403/403; 52/285.3; 52/285.4; 52/281; 52/582.1; 52/745.12; 52/741.1
[58] Field of Search ................. 52/58, 60, 272, 52/285.1, 285.4, 582.1, 741.1, 745.12, 285.3, 281; 403/292–294, 315, 318, 382, 403, 231, 205; 24/697.1, 573.1; 248/676, 678; 62/DIG. 16

[56] References Cited

U.S. PATENT DOCUMENTS

| 163,559 | 5/1875 | Wiswell | 52/285.4 |
|---|---|---|---|
| 1,557,523 | 10/1925 | Hahn . | |
| 1,710,610 | 4/1929 | Duke | 52/582.1 X |
| 1,919,780 | 7/1933 | Fairbank | 403/231 X |
| 2,423,955 | 7/1947 | Widener . | |
| 2,490,018 | 12/1949 | Davis . | |
| 3,113,358 | 12/1963 | Zell et al. | 403/231 X |
| 3,215,118 | 11/1965 | Behlen . | |
| 3,414,224 | 12/1968 | Robilliard et al. | 403/315 X |
| 3,490,797 | 1/1970 | Platte | 403/231 X |
| 3,499,672 | 3/1970 | Sunasky | 403/315 X |
| 3,511,004 | 5/1970 | Snellings . | |
| 3,545,712 | 12/1970 | Ellis | 403/231 X |
| 3,721,106 | 3/1973 | Bierwirth et al. . | |
| 3,802,131 | 4/1974 | Resech | 52/60 |
| 3,926,529 | 12/1975 | Brooks . | |
| 4,016,729 | 4/1977 | Cherry . | |
| 4,199,907 | 4/1980 | Bains et al. | 403/231 X |
| 4,501,193 | 2/1985 | Trigourea . | |
| 4,781,008 | 11/1988 | Lyons, Jr. . | |
| 4,941,300 | 7/1990 | Lyons, Jr. . | |
| 5,016,406 | 5/1991 | Calam et al. . | |
| 5,188,333 | 2/1993 | Schumacher et al. . | |

FOREIGN PATENT DOCUMENTS

| 0654045 | 12/1937 | Germany | 52/285.1 |
|---|---|---|---|
| 0329345 | 6/1936 | Italy | 52/285.1 |

OTHER PUBLICATIONS

New Hinge Curb Promotional Literature Roof Top Systems, Inc.

*Primary Examiner*—Carl D. Friedman
*Assistant Examiner*—Robert J. Canfield
*Attorney, Agent, or Firm*—Herbert L. Gatewood

[57] ABSTRACT

An interlocking joint or fastening means is provided wherein one fastening member is provided integral to a panel member to be fastened to another panel member. A second fastening member is provided having a tongue that intrudes into an opening provided by the integral fastening member.

20 Claims, 5 Drawing Sheets

5,465,533

MODULAR ROOF CURB ASSEMBLY CONSTRUCTION AND INTERLOCKING JOINT MEANS THEREFOR

BACKGROUND OF THE INVENTION (1). Field of the Invention

This invention relates, in general, to a novel means for fastening two abutting members together. More particularly, the invention relates to a novel mounting curb assembly for rooftop packaged air conditioning units which can be constructed from modular components by novel interlocking fastening means.

(2). Description of the Prior Art

Mounting curbs or assemblies, sometimes called "roof curbs," have been used now for many years by those in the air conditioning industry as a foundation or support member for packaged air conditioning units mounted on the tops of roofs of buildings. The roof curb assembly comprises, in general, two side walls or panel members and two end walls or panel members connected together at their ends to form a rectangular framework.

The roof curbs were, in earlier days, constructed by welding the ends of the panels together to form corners. Nevertheless, such was unsatisfactory for a number of reasons. One reason was that the roof curb components were assembled together off-site and welded. This, of course, resulted in difficulty in handling and raising the roof curb to the roof of the building on which it was to be installed.

Later, the roof curb components were provided in modular side and end panel members and assembled together at the work site. Thus, the panel members were sometimes interconnected at their ends by means of rivets or threaded fasteners. This proved somewhat better but still was not without some disadvantages. First of all, as can be appreciated, the assembly of the roof curb components was somewhat labor intensive. There were a considerable number of threaded fasteners involved which had to be located in the curb members by the installer and then screwed together. Moreover, the handling of such fastening means often resulted in some being dropped and lost, and need then for obtaining further such fastening means, to complete the job.

More recently, however, the assembly of the roof curb modular side and end walls or panel members has been somewhat improved. This has resulted because, in part at least, with the means now used for fastening two such panel members together to form a corner of the roof curb, one of the fastening members is provided integral to the ends of a panel member. Moreover, there are no screw or threaded fasteners with which to be concerned. Exemplary of such fastening means for interconnecting roof curb panel members together are those disclosed in U.S. Pat. Nos. 4,781,008; 5,016,406; and 5,188,333.

In U.S. Pat. No. 4,781,008, there is disclosed a frame assembly for a building opening which comprises four curb or wall elements connected together. Each of the corners of the frame assembly is formed by connecting an end plate of a wall element to one face of a vertically disposed corner post having a square cross-section, so that the wall elements are ninety degrees to one another. Each end plate is provided with two spaced-apart apertures located in vertical disposition one above the other. The two sides of the corner post at a right angle to one another are each provided with two, vertically disposed, spaced-apart fingers. Thus, when assembled together, the two faces of the corner post abut the end plates of two of the wall elements and the two fingers on each surface of the corner post engage with the apertures in the end plates.

U.S. Pat. No. 5,016,406 discloses an interlocking joint for a roof curb which comprises a male joint member secured to the inner face of the end of a roof curb side section and a female joint member secured to the inner face of the end of a roof curb end section to be joined thereto. The male joint member is constructed to have an "L" shape, the stem of the "L" fastened to the side section being jogged so that the lower portion of the stem defines a space with the inner face of the side section. The female joint member is defined by an inner and outer face, which together form between them a receptacle which is adapted to receive the male joint member. The outer face of the female joint is of an "L" shape construction. The inner face is a leg which has a jogged shape, one portion of the jogged shape abutting the stem of the "L" shape and being fastened to it and to the inner face of the roof curb end section. The other part of the jogged shape defines a space between the jogged shape and the stem of the outer face of the female joint. This space is adapted to receive the foot of the "L" shaped male member. Although this interlocking joint is quite satisfactory in certain respects, its use is not without certain disadvantages. One disadvantage is that the members making up the fastening means must each be manufactured apart from the side and end sections, requiring additional time and expense. Then, the members must be securely fastened, for example, by spot welds to a respective roof curb section.

U.S. Pat. No. 5,188,333 discloses a supporting frame for an air conditioning unit installed on the roof of a building. The frame comprises two spaced-apart, parallel side walls interconnected at their respective ends to the ends of two spaced-apart, parallel end walls. The side walls are each provided at their ends with perpendicularly disposed side flanges. In each of these flanges there is provided a plurality of fasteners, i.e. a tongue and an accompanying latch punched out of the flange. These fasteners are provided in pairs and in vertical alignment superposed one above the other. Each of the end walls is provided with two rows of slots or openings, each row of a like plurality of slots as the fasteners in the side walls. The two rows are spaced apart so that when an end wall is assembled with a side wall the slots will be in mating engagement with the fasteners. In providing the side walls in assembly with the end walls, the tongues on the flanges of the side wall slip into respective slots and in engagement with the edge of the slot. The length of the slot is such that when the tongue fully engages with the slot perimeter, the latch snaps into place in the slot. Thus, the free end of the latch engages with the edge of the slot and prevents the end wall from being moved so as to be free of engagement with the tongue.

Another roof curb of which we are aware involves the providing of means integrally adjacent the ends of two panel members which are to be connected together to form a corner. Thus, in the one panel member, adjacent the vertically disposed linear edge thereof, there are provided two spaced-apart rectangular-shaped openings, one above the other. The other panel member is provided with a flange at its end which extends inwardly and perpendicular to the panel. In the flange are provided two spaced-apart tongues or elongated members, each of which is connected at its base to the panel member. Each tongue lies in a plane parallel to that defined by the panel so that a space exists between the tongue and the panel member. The tongues are so located on the flange that when the flange is placed into contact with the other panel member a portion of that panel member which surrounds the openings can be captured in the space between the tongue and the other panel member. Although this roof curb is satisfactory to a certain extent, its use presents certain problems. One problem involves joining a side panel member and end panel member together in forming the fourth corner. This is made somewhat difficult due to the fact that the means for fastening the two panel members together to form the corner are provided in the panel members themselves, and the fact that the panel members are somewhat inflexible at this point of assembly.

Also known to us is a so-called "hinge roof curb." In this construction, the corner assembly of a roof curb basically comprises a butt hinge such as used in mounting a door. Thus, the end of a curb side section is integrally provided with one part of the hinge. The end of the end section of the curb is integrally provided with the mating part of the hinge. The curb end and side sections are assembled together so that the hinge parts mate together and then the "hinge" pin is driven downwardly through the openings in the mating sections. Thus, the end section is joined or interlocked to the side section and a corner of the roof curb is formed. After the four corners are assembled together, the curb is checked to be sure it is in "square." This is done by measuring diagonally from each of the opposite corners. This dimension should be the same for each direction. This fastening means, however, suffers from several disadvantages. First of all, the parts of the "hinge" must be in good alignment with one another as anyone who has taken a door down and then put it up again is readily aware.

Thus, there is still the need for a roof curb assembly which comprises modular components, i.e., side and end walls or panel members, of simple construction and which can be assembled together with greater ease.

SUMMARY OF THE INVENTION

It is therefore one object of the present invention to provide a novel roof curb assembly not having the problems and difficulties of those known heretofore.

Another object of the invention is to provide means of relatively simple construction for the fastening together of two roof curb modular components.

A further object of the invention is to provide economical means for the fastening together of roof curb side and end walls.

A still further object of the invention is to provide means for fastening together the ends of a side and end wall in a roof curb assembly that provides a joint that is both strong and rigid.

A still further object of the invention is to provide a corner joint in a roof curb assembly that is made inherently square in the assembly of the side and end walls.

A still further object of the invention is to provide a self locking fastening means for a roof curb assembly whereby the fastening members are positively prevented from becoming loosened or disconnected from one another.

Further, an object of the invention is to provide fastening means that provides a tight interlocking joint even though the members to be joined together and the fastening members may not be held to close tolerances.

The above and other objects, as will become apparent to those skilled in the art hereinafter, are obtained by the present invention which is characterized by an assembly comprising at least two members joined together, each of the members being defined by a planar surface and a linear edge, at least one fastening member defined by an inner planar surface and an outer surface extending outwardly from each of the planar surfaces of the members, an inner surface of the fastening member being in a plane parallel to the planar surface of the member to be fastened, the inner surface of each said fastening member being spaced-apart from the planar surface of the member from which it extends, said fastening members being located in predetermined locations on the respective members, an opening being defined in each of the fastening members by the space between said inner surface of the fastening member and the planar surface of each said member to be fastened together, the linear edge of one said member being in abutting engagement with the linear edge of the other member and the at least one fastening member on the planar surface of each of the two members each being on the same side of each of the members, a further fastening member complementary to each said at least one fastening member each being defined by at least one planar surface, the complementary fastening member being further defined by two spaced-apart openings provided in and extending through said complementary fastening member, each said opening being defined by a peripheral edge and being so located on the further fastening member and of such a size as to surround the said at least one fastening member provided on each of the two members, an elongated member being provided in each of the openings in the complementary fastening member and extending inwardly from said edge thereof, each said elongated member extending through the opening provided in each said at least one of the fastening members when the said at least one planar face of the further complementary fastening member is in face-to-face contact with the planar face of each of the two members to be joined together whereby the two members are joined together.

Quite advantageously, the corner of the roof curb assembly is provided with improved rigidity and stiffness by the fastening means of the invention.

Of further advantage is the fact that the roof curb assembly is self-squared by the use of fastening means in accordance with the invention.

BRIEF DESCRIPTION OF THE DRAWINGS

For a better understanding of the invention disclosed herein, reference should be made to the following detailed description of the preferred embodiments of the invention which are to be read in conjunction with the accompanying drawings, in which.

DETAILED DESCRIPTION OF THE INVENTION AND THE PREFERRED EMBODIMENTS THEREOF

Although the present invention will be described hereinafter with particular reference to the accompanying drawings, it is to be understood at the outset that it is contemplated that the invention may be varied in specific detail from that illustrated and described herein while still achieving the desirable characteristics and features of the invention. Accordingly, the description which follows is intended to be understood as a broad enabling disclosure directed to persons skilled in the applicable arts, and is not to be understood as being restrictive.

Figure 1:
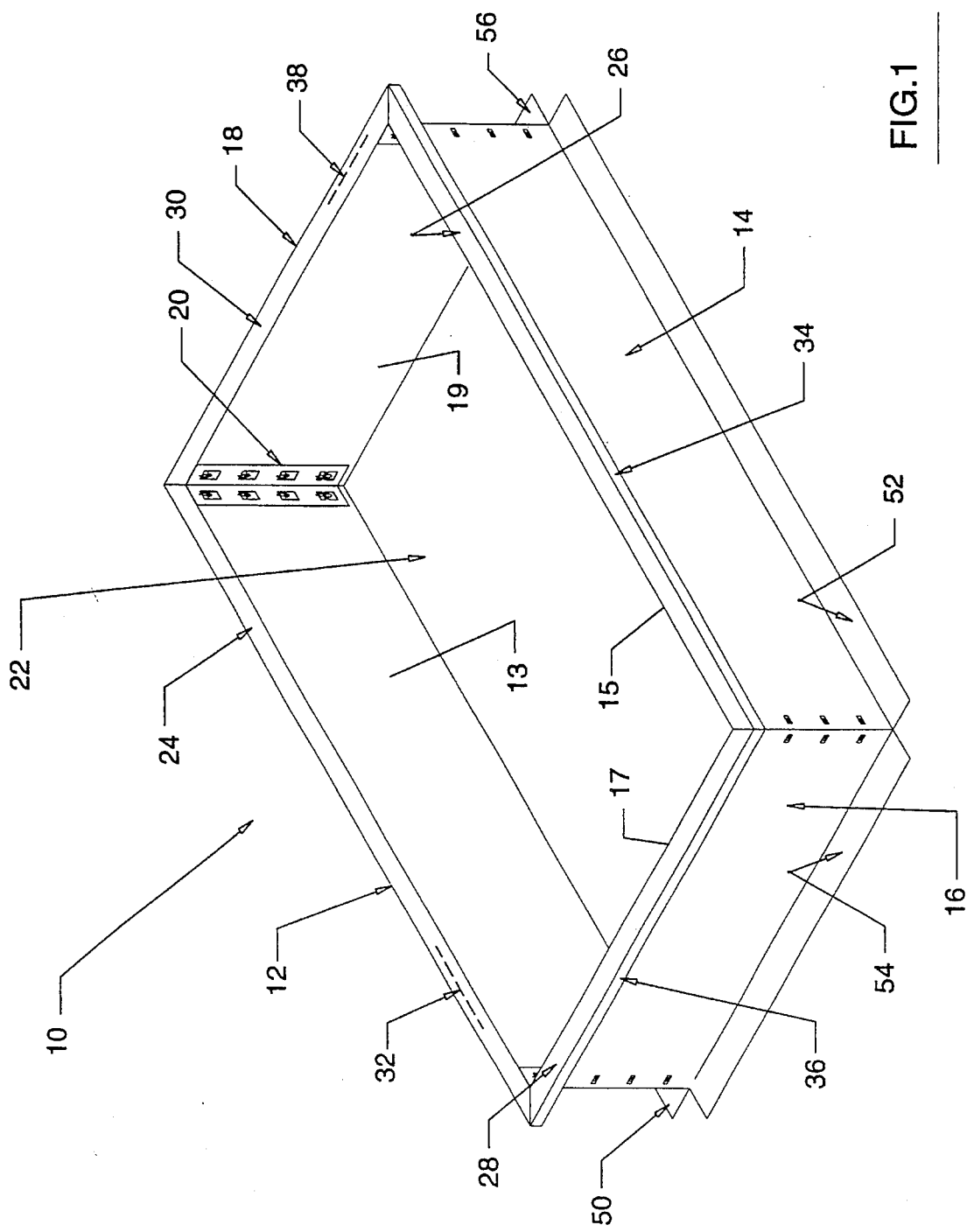
FIG. 1 is a view in perspective of a rectangular-shaped roof curb assembly of the invention, showing an end and a side wall connected together to form a right-angle corner with fastening means according to the invention.

Referring now to FIG. 1 of the drawings, there is shown therein a curb assembly 10 in accordance with the invention. The curb assembly 10 comprises vertically disposed side walls or panel members 12, 14 interconnected at their linear ends with the linear ends of the vertically disposed end walls or panel members 16, 18 by fastening means according to the invention referred to generally in the drawing by reference numeral 20.

The side and end walls are each defined by inner and outer planar surfaces parallel to one another, only the inner surfaces 13, 15 and 17, 19 being specifically identified in the drawings. The inner planar surfaces 13, 15 are in predetermined spaced-apart parallel relationship to one another, as are the inner surfaces 17, 19 of the end walls 16, 18, respectively. Thus, there is defined a rectangular-shaped cavity 22. Nevertheless, it will be appreciated that the side and end walls can be of the same length, if desired, whereby to provide a square-shaped assembly.

The side and end walls are each provided at the top edges thereof with outwardly extending, horizontally disposed flanges identified by reference numerals 24,26 and 28,30, respectively. This provides a supporting surface for the mounting of a packaged air conditioning unit in accordance with usual techniques. The flanges 24,26 and 28,30 terminate in downwardly extending flanges 32,34 and 36,38, respectively.

Extending outwardly from the bottom edges of the side and end walls are horizontally disposed bottom flanges 50,52 and 54,56, respectively. These bottom flanges lie in a horizontally disposed plane parallel to that defined by the top flanges. As is well known to those skilled in the art, the bottom flanges are used for supporting the roof assembly 10 on the roof of a building and for attaching the roof assembly to the rooftop. This can be accomplished in usual fashion.

Figure 2:
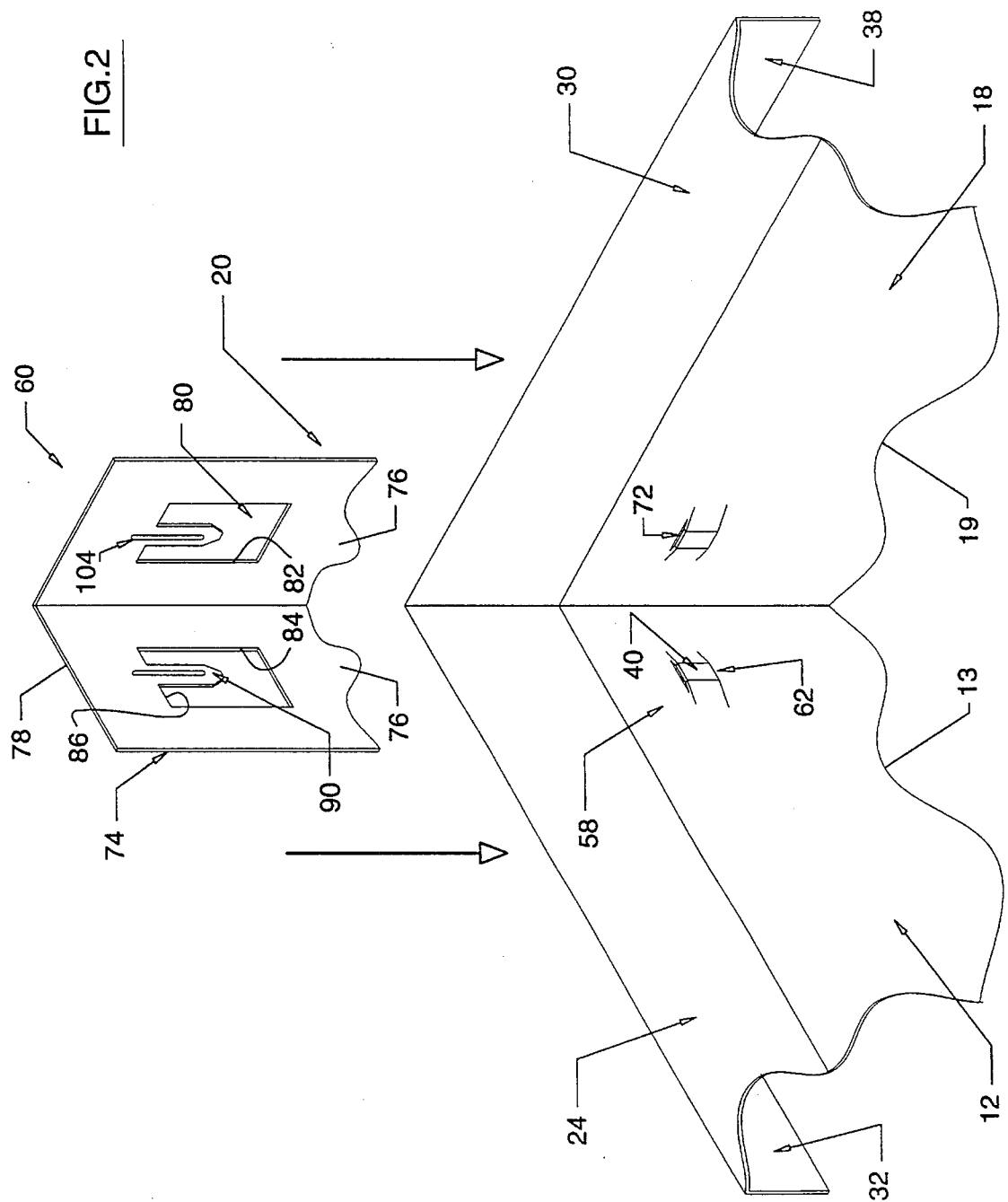
FIG. 2 is an enlarged, exploded, perspective view showing, in part, a corner of the roof curb assembly of FIG. 1 and the fastening or joining means of the invention.

The fastening or joining means 20 of the invention, as will be better appreciated by reference to FIG. 2, comprises two fastening members indicated, in general, by reference numerals 58 and 60. For sake of clarity and ease in describing the invention, reference made hereinafter to "fastening means" will be considered as referring to the combination of a single fastening member 58 and a single fastening member 60, or a plurality thereof which operate together as shown in the drawings. Thus, the fastening means 20 shown in FIG. 1 for the roof assembly 10 actually comprises four, vertically disposed, spaced-apart fastening means. Nevertheless, as each of the fastening means is of the same construction and operates in the same manner, only one such fastening means will be more specifically described hereinafter.

It will be appreciated, however, that a particular application will determine the actual construction of fastening means necessary to join two members together in the desired manner. In certain applications, for example, where two relatively narrow strips are being joined together a single fastening means, i.e. a single fastening member 58 and a single fastening member 60, may be found quite satisfactory. For other applications, e.g. the roof curb assembly 10 of this invention, the fastening means comprises a plurality of fastening members 58 and fastening members 60, in operative engagement with one another, as hereinafter more fully described. The more preferred fastening means for joining together a side and end wall in a roof assembly according to the invention comprises four fastening members 58, 60. This has been found not only to provide a tight and rigid joint but one also of high strength.

The fastening member 58, as shown in the drawings (FIG. 2), comprises an elongated member 62 provided in horizontal disposition and is, in the more preferred aspect of the invention, integral to that wall being connected to another, in this case a fastening member 58 being provided in side wall 12 and end wall 18. This elongated member, in the more preferred aspects of the invention, comprises a centrally disposed keeper or member 40 which comprises inner and outer planar surfaces 64, 66, parallel to one another. The keeper 40 is seen to be of rectangular shape, the ends 42, 44 of which are connected integrally to side wall 12 by means of elongated rectangular-shaped connecting straps 46, 48. It will be appreciated, however that the shape of the connecting straps is of no particular importance to the practice of the invention. The important consideration is that, whatever the shape of the connecting straps, such hold the keeper 40 so that the inner planar surface 64 thereof is in a plane parallel to that defined by the inner planar surface 13 of sidewall 12. Moreover, the member 40 need be rigidly maintained in a predetermined spaced-apart distance from the inner planar surface 13 of the side wall. Thus, there is provided a vertically disposed elongated opening or receptacle 72 the purpose for which will soon be disclosed if not already appreciated from the drawings.

The complementary fastening member 60 shown in the drawings, e.g. FIG. 2, comprises a member 74 defined by inner planar surface 76 and outer planar surface 78, these surfaces being in parallel disposition to one another. Nevertheless, as will be later more fully appreciated, in some applications for the invention, only one of the surfaces need be planar. In member 74, there is provided a vertically disposed rectangular-shaped opening 80 having a perimeter defined by vertically disposed spaced-apart side edges 82, 84 and horizontally disposed spaced-apart end edges 86, 88. Extending downwardly, midway between the side edges 82, 84, is an elongated member or tongue 90 defined by parallel, vertically disposed side edges 92, 94. The tongue 90 is seen to be integral to the top end edge 86 and is further defined by inner and outer surfaces 96, 98, these being in the same planes as inner and outer planar surfaces 76, 78, respectively. This is an important and critical feature of the invention as will be better appreciated hereinafter. The bottom or free end of tongue 90 is defined by inwardly tapering edges 100, 102, the edges tapering inwardly at equal angles. Although tongue 90 is seen to terminate in a straight edge 103, this need not be the case. The tongue can terminate in a rounded end, if desired. In some applications for the invention, the tongue can even terminate in a sharp point, if desired. Nevertheless, in the preferred aspect of the invention, the free end of the tongue 90 will be somewhat tapered, as shown in the drawings, as this will facilitate in some cases the entry of the tongue into the opening therefor.

The fastening member 60, in the more preferred aspects of the invention, further comprises an elongated member 104 that protrudes outwardly from inner surface 76. The length of the member or protuberance 104 can vary somewhat, depending upon the length of tongue 90, and the length needed for the intended purposes therefor, later more fully disclosed. Nevertheless, in the more preferred aspects of the invention, the length of member 104 will extend from above the top end edge 86 about ¼ inch to at least about half the length of the tongue 90. The length of member 104 should not, however, interfere with the tongue being fully located in the opening 72 provided in fastening member 58 when the two fastening members 58, 60 are in interlocking engagement with one another, later more fully disclosed. Neither should the member 104 protrude outwardly from the inner surface 76 to such an extent as to prevent the tongue from being fully seated in the opening 72. The member 104 is shown to be rounded, i.e., having the cross-section of a semi-circle; however, this need not necessarily be the case. The member 104 can be of other cross-sectional shape, if desired, for example of triangular shape. Moreover, in some applications, member 104 may be desirably tapered from the top to the bottom end thereof. Thus, as will be later more fully appreciated, this will permit the tightness of the joint to be ever increased as the tongue 90 is being driven more fully into the opening 72.

The tongue 90, as shown by the drawings, terminates short of the bottom end edge 88 of opening 80. The length of tongue 90 is, of some critical importance; however, this depends to some extent upon the distance from the top edge 106 to the bottom edge 108 of keeper 40 of the fastening member 58. Desirably, the tongue 90 will be of such a length that its free end extends below the bottom edge 108 when the two fastening members are fully engaged with one another. The length of tongue 90 need also be considered in combination with the length of the rectangular-shaped opening 80. Thus, the length of opening 80 need be such that when the two fastening members are initially placed in combination with one another, the member 62 can intrude into the opening 80 without interference with the bottom end of tongue 90.

Although, the fastening member 58 is provided in the preferred aspects of the invention integral with the side wall member being fastened to an end wall member, as more particularly disclosed herein, this need not necessarily be the case. In a somewhat lesser desired embodiment of the invention, the member 62 can be separately provided from the manufacture of the side and end walls. Thus, such a member can be die-cut from suitable material and then fixedly secured to the side or end wall by conventional fastening means, e.g., rivets, spot welding, etc. Manufacturing of such fastening members during the manufacturing of the side and end walls is much preferred, however, as such is more efficient and economical. Further, it provides an integral fastening member of simple construction.

Figure 3:
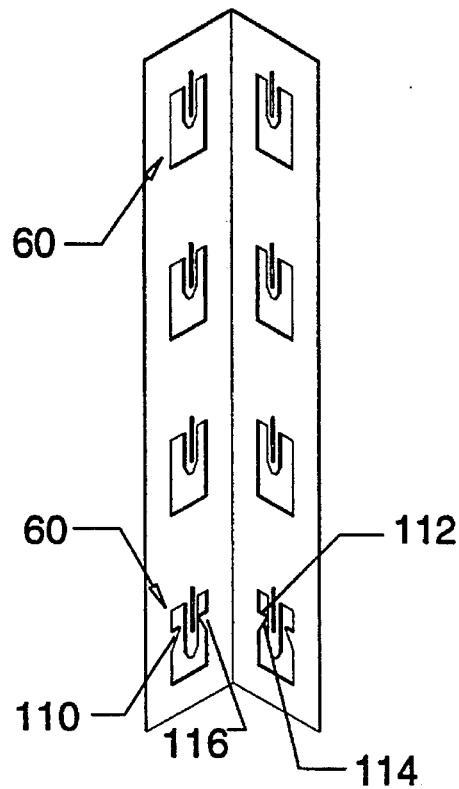
FIG. 3 is a perspective view of one of the two fastening members making up the fastening means of the invention.
Figure 5:
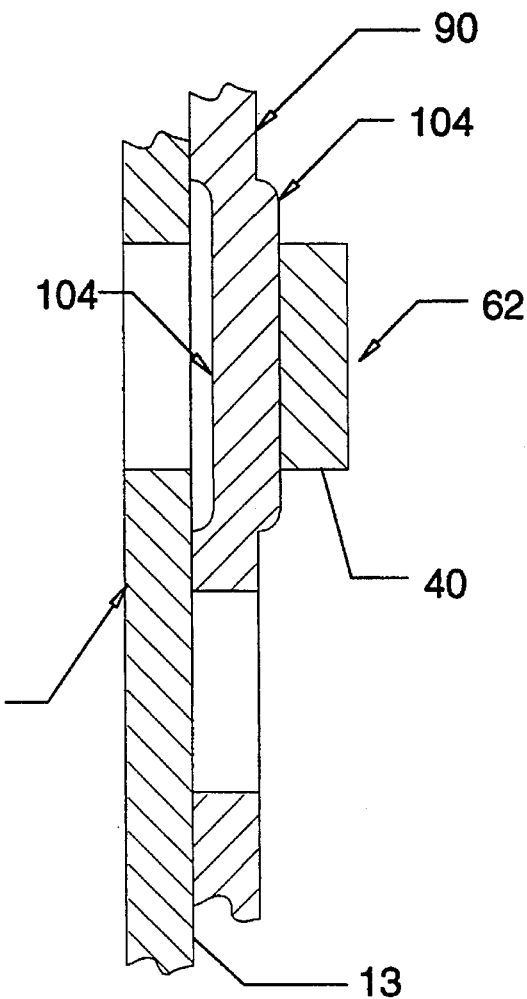
FIG. 5 is a view in cross-section taken at section line 5—5 in FIG. 4 further showing the two fastening members of the fastening means of the invention in interlocking engagement and showing the elongated protuberance on the tongue of the fastening member which functions to tighten the joint formed by the two fastening members.
Figure 4:
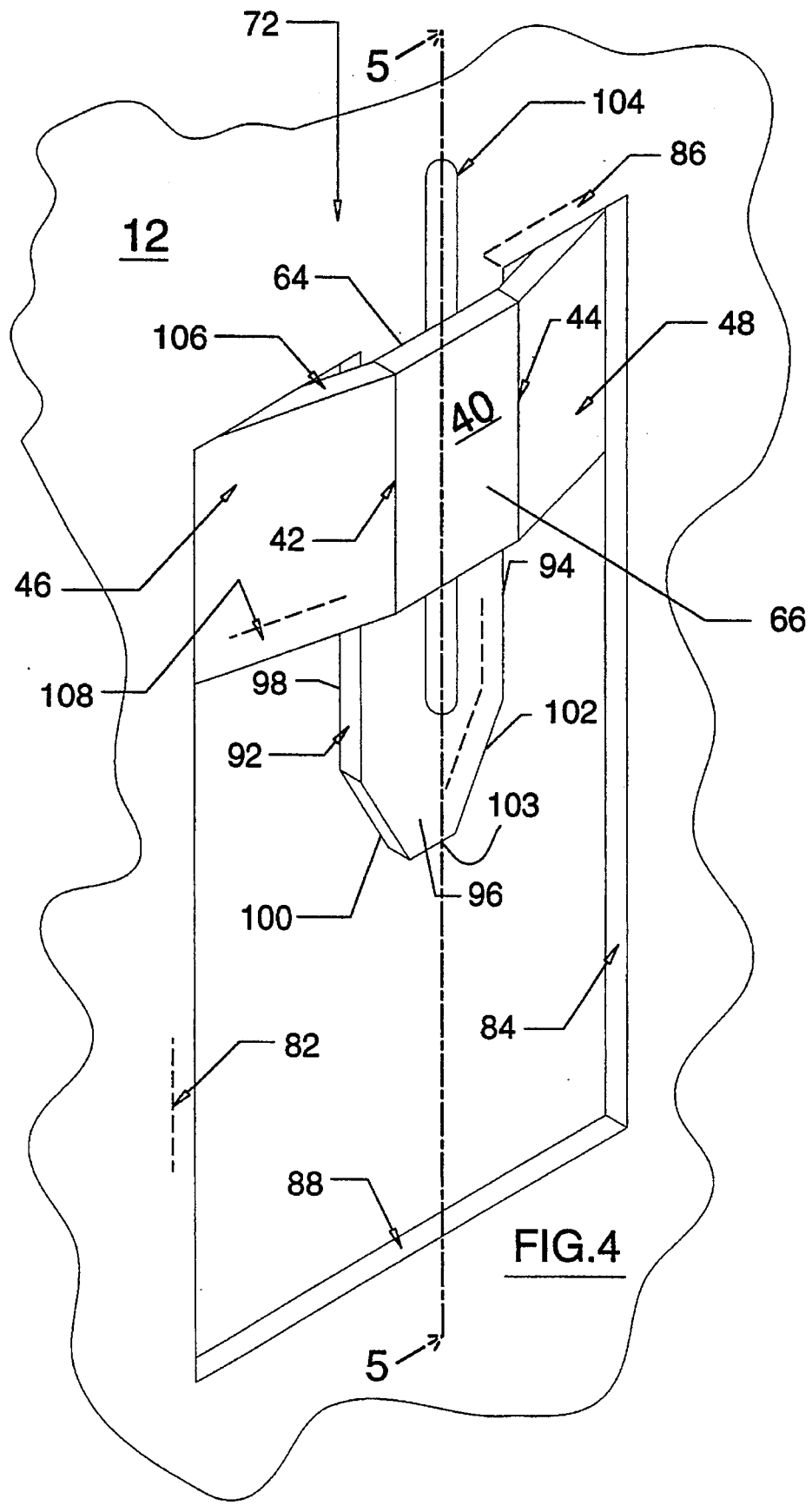
FIG. 4 is a greatly enlarged partial view in perspective showing the two fastening members of the fastening means according to the invention in interlocking engagement with one another.

In the most preferred aspects of the invention, as shown in FIG. 3, a locking member 110 is provided in combination with fastening member 60 so that when the two fastening members 58, 60 are in operative combination, they will be positively interlocked with one another. The locking member 110 comprises an elongated top edge 112 which extends perpendicularly outwardly from the side edge 82 of the rectangular-shaped opening 80. Extending downwardly from the terminal end of the edge 112 is an inwardly tapering edge 114 that terminates at the edge 82 of the opening. Thus, there is provided a tooth-shaped locking member that, as will be better appreciated hereinafter, functions much like a ratchet. The locking member 110 need not be of this particular shape. It could be of rectangular shape, if desired. The main consideration is that a top linear edge be provided like top edge 112.

Figure 6:
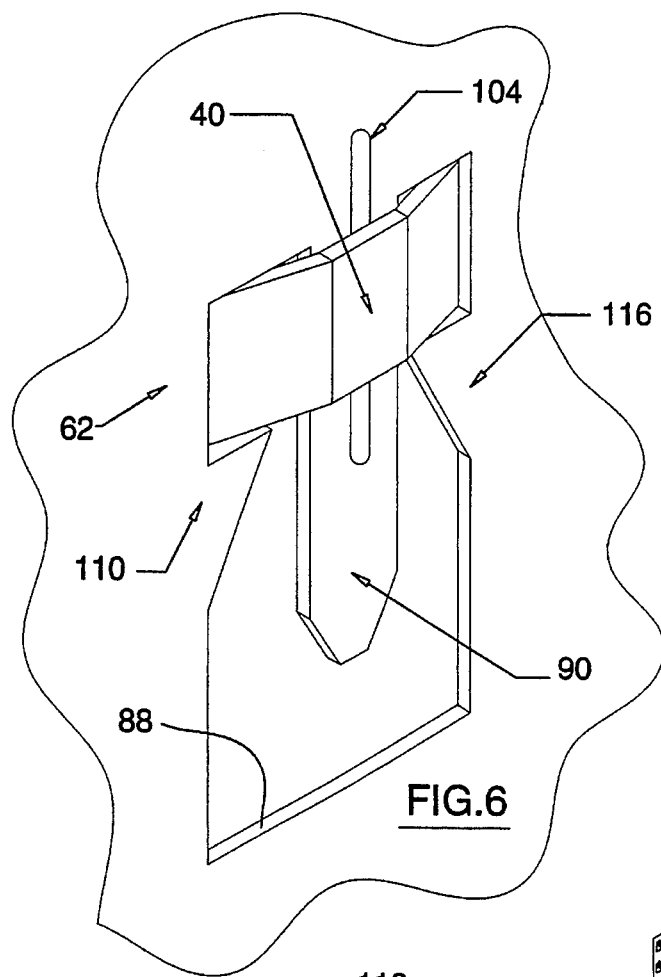
FIG. 6 is a perspective view showing in part two members joined together and the locking means for positively locking together the two fastening members according to the invention.

It will be noticed from FIG. 3 that a locking member 116 in mirror image to locking member 110 is provided integral to side edge 84 and in direct opposition thereto. The particular location of the top edges of the locking members is of critical concern, and will depend somewhat upon the length of the tongue 90 and the rectangular-shaped opening 80. The location of these top edges should be down from the top edge 86 of the opening such as to allow the tongue 90 to be fully seated. When such occurs the bottom edges of the connecting straps for the keeper 40 will be trapped by the top edge of the locking members, as is shown in FIG. 6.

In the practice of the invention it has been found quite satisfactory that only one of the fastening members has been provided with locking members, as shown in FIG. 3. Nevertheless, locking members can be provided in combination with each of the fastening members 60 in a fastening means of the invention, if desired.

Figure 7:
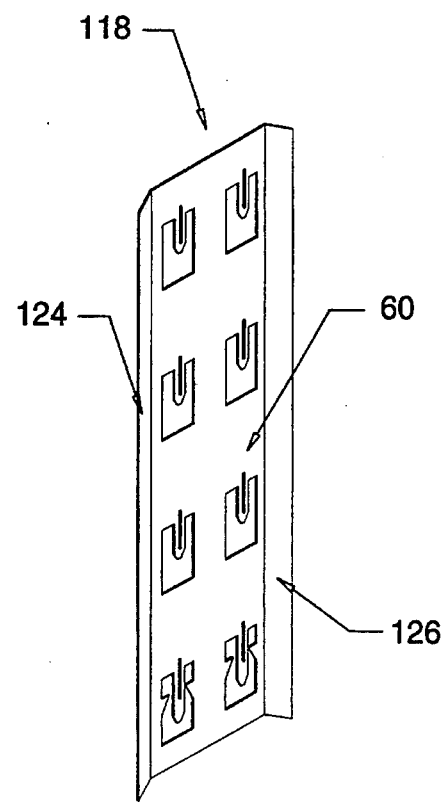
FIG. 7 is a perspective view showing a further fastening member or butt strap according to the invention for fastening together two side panel members or the like in abutting relationship.
Figure 8:
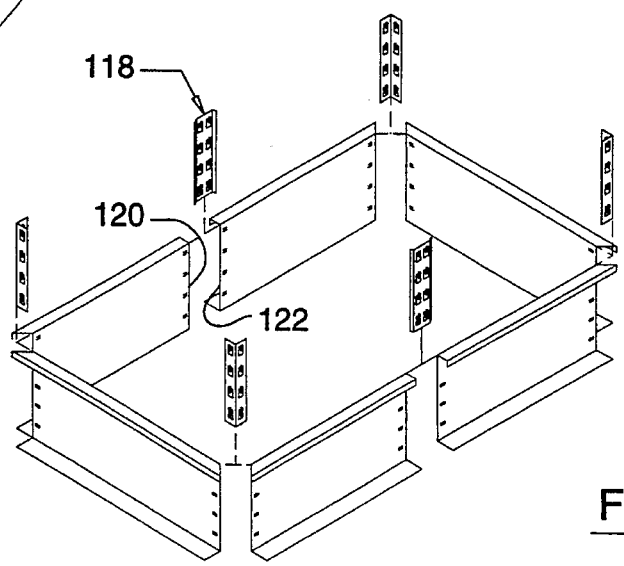
FIG. 8 is an exploded view in perspective showing the joining together of the ends of two side walls using a butt strap of the invention as shown in FIG. 7 for a larger roof curb assembly, as well as the formation of the corners thereof.

The fastening means of the invention is not limited to corners, as will be readily appreciated by reference to FIGS. 7,8. As shown in FIG. 7, a fastening member or butt strap 118 can be provided for the connection of the vertically disposed linear ends 120, 122 in abutting fashion. In the more preferred aspects of the invention, the butt strap 118 will terminate at its end edges in flanges 124, 126. These provide somewhat greater strength and inflexibility to the fastening means particularly when such comprises a plurality of fastening members 58, 60, as shown in the drawings.

Neither is the fastening means of the invention limited to mitered corners as shown in FIGS. 1, 8. It can be used also with side wall and end wall assemblies that are formed with square corners. Moreover, it will also be appreciated by those in the art that the fastening means of the invention need not be limited to use on the inside of the corner. In applications where there is no top flange as shown in the drawings, the fastening member 60 can be provided in combination with the outer surface of the corners. The main thing is that fastening member 58 be provided with a planar surface that can mate with the planar surface provided with fastening member 60. The other surfaces of the two members can be planar or not, as desired.

Although the fastening member 58 shown herein comprises a keeper 40 of rectangular shape, the keeper can be of other shape, if desired. The keeper can even be of a round shape provided that its inner surface is planar so that it mates well with the planar surface of the tongue 90. If of round shape, it may be desirable to provide opposing cut-outs therein having top linear edges for capture of the locking members 110, 116. The opening 80 in fastening member 60 can also be of other shape, e.g., circular-shaped. The primary consideration, whatever the shape, is that the tongue of the fastening member 60 extend vertically downwardly. Nevertheless, it is possible that in certain applications other than in a roof curb assembly, the orientation of the tongue 90 can be horizontal rather than vertical, as specifically disclosed herein. In that case, the orientation of the keeper 40 will be vertical rather than horizontal.

Further, in some cases, it may be more desirable to provide the fastening member 60 integral with the panel members to be butted together, rather than as shown in the drawings. In that case, the fastening member 58 will be provided as the complementary fastening member.

The manufacture of fastening means according to the invention will depend to some extent upon the particular application therefor, as well as on the material of construction. In the case of a roof curb assembly, as shown in FIG. 1, where an air conditioner unit of substantial weight need be supported, the fastening means will, most desirably, comprise four fastening members 58 and four complementary or cooperative fastening members 60. The fastening members 58 for this application can be provided during the manufacture of the side and end wall for the roof curb. These walls are constructed of heavy gauge, galvanized steel. Thus, the fastening members 58 can be punched into the side and end walls according to usual techniques so that they are provided in superposed manner one directly above the other and in the desired spaced-apart locations. The optimum distance between the fastening members 58, in the case of a roof curb assembly, can be readily determined by those skilled in the art.

The die punching operation should be such as to provide an opening 72 of sufficient distance from the planar surface of the side and end walls to accommodate the thickness of tongue 90. Nevertheless, this distance cannot be so great as to result in connecting members or straps 68,70 that are so weakened as to be unable to properly maintain member 40 in its rigid upright position and intact with the side or wall from which it is punched.

The manufacture of the fastening member 60 and its particular configuration will depend to some extent upon the intended application therefor. Where such is to be used in the assembly of roof curb side and end walls, two configurations will be needed in some cases, as shown by FIG. 8. In the case of a corner formation, a fastening member 60 like that shown in FIG. 3 of the drawings is required. Thus, a planar member of heavy gauge steel of suitable dimensions can be provided with the fastening members 60 of the invention by usual die-cutting techniques. These fastening members will be provided in two spaced-apart rows, each of the same number of fastening members and in the desired spaced-apart locations suitable for co-operative engagement with the fastening members 58. This can readily be determined by those skilled in the art. Then, the planar member can be further worked to provide an angle member such as shown in FIG. 3 or a butt strap member such as shown in FIG. 7, as needed.

In some applications, a fastening member rather than a right angled fastening member may be desired for fastening two members together such as an end and side panel. Thus, following die-cutting of the fastening members 60 in the planar member, as earlier disclosed, the planar member can be bent to form any angle desired, according to practices well known to those in the art.

Although the invention has been particularly disclosed with respect to a roof curb assembly, it will be appreciated that the fastening means of the invention has many applications where two members need be joined together in abutting manner. Neither is the invention limited to assemblies involving steel components. The members being joined together by fastening means of the invention may be of other materials of construction, e.g., of various plastic compositions. In such a case the fastening members could be provided by injection molding techniques, if desired. The fastening means of the invention may find use even in childrens toys such as erector sets and the like building toys.

In use of the invention, the roof curb components are taken to the rooftop where the air conditioning unit is to be installed. A side wall and end wall are placed together at a 90 degree angle with respect to one another so that the vertically disposed linear edges of each are in abutting engagement. The outer surfaces of the fastening member 60 are placed in contact with the inner surfaces 13, 19 of the respective side and end wall, as will be appreciated by reference to FIG. 2 of the drawings. Thus, the fastening member 58 will extend through the bottom half of the opening. While the fastening member 60 is held in this disposition, the fastening member is caused to be forced downwardly, as indicated by the arrows in FIG. 2. This can be accomplished in ready fashion by hitting a top edge of the fastening member with a hammer or like instrument, driving the fastening member 60 vertically downwardly. In so doing, the tongue 90 of fastening member 60 is caused to intrude into the opening 72 provided by fastening means 58 in male-female fashion.

As the fastening member 60 is driven downwardly, the elongated protuberance 104 provided on the tongue causes an outward force component to be directed against the inner surface 64 of the keeper member 40. This causes the inner surface 13 of side wall 12 to be forced tightly against the outer surface of the fastening member 60. Thus, there is provided a good tight joint between the two fastening members and, hence, between the inner surface and the outer surface. This joint is made even tighter as the fastening member 60 fully seats with the fastening member 58. Furthermore, as the fastening member 60 is driven downwardly, the locking members 110, 116 associated with the bottom fastening member 60 are caused to pass by the member 62 of the fastening member 58, thus causing the bottom edges of the connecting straps to engage with the top edge of the locking members.

Although the present invention has been shown in some detail with one specific embodiment, it will be readily apparent to those skilled in the art, as above disclosed, that various changes in form and arrangement of parts may be made to suit requirements without departing from the spirit and scope of the invention.

What is claimed is:

1. An assembly comprising at least two members joined together, each of the members being defined by a planar surface and a linear edge, at least one of a first fastening member being provided on each one of the members joined together, each said at least one of a first fastening member comprising a keeper defined by an inner surface and an outer surface extending outwardly from each of the planar surfaces of said two members joined together and in perpendicular disposition thereto, the inner surface of each said keeper being spaced-apart from the planar surface of the respective member joined together, said at least one first fastening member being located in a predetermined location on each one of the two members joined together, an opening being defined in each of the first fastening members by the space between the inner surface of the keeper and the planar surface of each said member joined together, the linear edge of one said two members joined together being in abutting engagement with the linear edge of the other of the two members joined together and the at least one first fastening member on each of the two members joined together each being on the same side of each of the two members joined together, a second fastening member complementary to each said first fastening member being provided for each of said at least one first fastening members, each said second fastening member being defined by a least one planar surface, said second fastening member being defined by an opening provided in and extending through each said second fastening member, each said opening being defined by a peripheral edge and being so located on the second fastening member and of such a size as to surround the said at least one first fastening member provided on each of the two members joined together when such are in operative engagement with one another, an elongated member being provided in the opening in each of the second fastening members and extending inwardly from said peripheral edge thereof, each said elongated member extending through the opening provided by the at least one first fastening member when the said at least one planar face of the second fastening member is in surface-to-surface contact with the planar surface of each of the two members joined together whereby the two members are joined together.

2. An assembly according to claim 1 wherein the two members joined together are at predetermined angles to one another at the abutting linear edges and the second fastening member comprises two members each defined by a planar surface joined together at the same angle as the two members joined together, each said second fastening member being located in predetermined locations for mating engagement with a first fastening member.

3. An assembly according to claim 1 wherein the two members joined together are each of the same thickness and each is defined by inner and outer planar surfaces parallel to one another and at least two of said first fastening members are provided in each of the two members joined together, the at least two first fastening members each being provided along the linear edge of each of the respective members joined together and in alignment with one another so that the openings provided in each of the second fastening members are aligned with those in the first fastening members.

4. An assembly according to claim 1 wherein at least one of the at least two members joined together comprises a first and second member each being defined by a linear edge and a planar surface in abutting engagement at their linear edges With each other and the planar surface of each said first and second members lies in the same plane, each said first and second member comprises at least one first fastening member provided therein adjacent said linear edge of each of the first and second members and in direct opposition to one another, and the second fastening member complementary to said at least one first fastening member comprises a member defined by a planar surface and bridging the two abutting edges of said first and second members, said second fastening member defined by a planar surface comprising two spaced-apart openings in predetermined locations so as to mate with a respective said at least one first fastening member, the first fastening member being integral with a member joined together.

5. An assembly according to claim 4 wherein the member defined by a planar surface and which bridges said two abutting edges is defined by parallel, spaced-apart linear edges located on opposite sides and parallel to the abutting linear edges of the first and second members joined together, and a flange is provided at each of the linear edges of the member defined by a planar surface, each said flange being integral with a linear edge and extending at a predetermined angle therefrom and outwardly from the planar surfaces of the two members joined together.

6. A means fastening together the ends of two panel members each being defined by parallel planar surfaces and a linear edge in abutting engagement with one another along said linear edges, said fastening means comprising at least one first fastening member being provided adjacent the linear edge in each of the panel members and being integral therewith, each said at least one first fastening member comprising a keeper defined by an inner planar surface spaced apart from and being in parallel disposition to the planar surface of the panel member and two spaced-apart parallel edges which extend in a direction parallel to the linear edge of a panel member to be fastened to the other panel member, said keepers provided on the panel members each being provided on the same side of the panel members, elongated connecting members being located on each side of a keeper and being defined by outer and inner ends, the outer end of which is connected to one of the edges of the keeper and the inner end being integrally connected to the panel member to be joined, an opening being provided in the space between the planar surface of the keeper and the planar surface of a panel member to be joined, said means fastening further comprising a second fastening member complementary to the first fastening member comprising a member defined by a planar surface, an opening being provided in said member of the second fastening member for association with each of said at least one first fastening member, each said opening being defined by a peripheral edge, a tongue extending inwardly from said peripheral edge, each said tongue being capable of extending into the opening provided in each first fastening member whereby the two panel members can be connected together when the fastening members are provided in operative engagement.

7. A roof curb assembly comprising first and second vertically disposed, elongated side walls each being defined by inner and outer planar surfaces and spaced-apart, top and bottom, horizontally disposed edges in parallel disposition to one another and vertically disposed, spaced-apart, end edges, and vertically disposed, spaced-apart, elongated, end walls each being defined by inner and outer planar surfaces and spaced-apart bottom and top edges parallel to one another and spaced-apart, parallel vertically disposed end edges, a plurality of first fastening members being provided on and in combination with each said side and end wall adjacent the end edges of each, each said fastening member comprising a keeper defined by an inner vertically disposed surface spaced-apart from the respective inner planar surfaces of the side and end walls so as to define an opening between said planar surface of each said wall and the inner surface of a keeper, said plurality of first fastening members being provided in superposed position one above the other and spaced apart from one another a predetermined distance, the vertically disposed end edges of the side walls being in abutting engagement with the end edges of the end walls, and a plurality of second fastening members being operatively engaged with each said first fastening member, each said second fastening member comprising two side members each being defined by inner and outer planar surfaces and a linear edge, said side members being of equal length and joined together at the linear edges thereof to provide a common edge and extending outwardly from that common edge at a predetermined angle with respect to one another, a like plurality of complementary fastening members being provided in each said side member as first fastening members provided in the respective side and end walls, each said complementary fastening member comprising an opening defined by a top end edge, an elongated member defined by inner and outer planar surfaces, these being provided in the same plane as the inner and outer surfaces of the side member in which it is provided and extending inwardly a predetermined distance from said top end edge, the openings of the, complementary fastening members being so located and of such a dimension as to allow a respective first fastening member provided in the side and end walls to protrude therethrough when the side members of the second fastening members are in contact with a respective end and side wall, the elongated members in each of the complementary fastening members intruding into the opening defined by a first fastening member whereby the ends of a side and end wall are joined together.

8. A roof curb assembly according to claim 7 wherein the openings provided in the second fastening members are each further defined by spaced-apart vertically disposed parallel side edges and a bottom end edge spaced-apart from and parallel to the top end edge.

9. A roof curb assembly according to claim 8 wherein the elongated member is defined by vertically disposed parallel side edges and terminates in edges that taper inwardly from the side edges at equal angles.

10. A roof curb assembly according to claim 9 wherein the tapered side edges terminate in a linear edge laterally disposed to the side edges.

11. A roof curb assembly according to claim 7 wherein the keeper of each said first fastening member is defined by spaced-apart end edges parallel to one another, and the first fastening member further comprises elongated connecting straps each defined by an inner end and an outer end, the outer end of a connecting strap being integral to a respective end edge of the keeper and the inner ends of a connecting strap being connected to a respective end wall or side wall joined together whereby the first fastening member is provided integral to the respective side or end wall joined together.

12. A roof curb assembly according to claim 9 wherein the elongated member of a second fastening member is further defined by an elongated vertically disposed member being located between the side edges of the elongated member and said elongated vertically disposed member protrudes outwardly a predetermined distance from the outer planar surface of the elongated member, the said elongated vertically disposed protruding member causing a force to be directed outwardly against the inner surface of a keeper of the first fastening member and resulting in a tight joint between the first and second fastening members when such are in operative association with one another.

13. A roof curb assembly according to claim 12 wherein the elongated vertically disposed outwardly protruding member is defined by a top end and a bottom end and said elongated vertically disposed outwardly protruding member tapers inwardly from the top end to the bottom end.

14. A roof curb assembly according to claim 12 wherein the elongated protruding member is defined by a curved surface.

15. A roof curb assembly according to claim 14 wherein the connecting straps are each further defined by a horizontally disposed bottom edge.

16. A roof curb assembly according to claim 15 wherein at least one of the said complementary fastening members further comprises locking means, said locking means being defined by a horizontally disposed edge extending perpendicularly outwardly from at least one of the side edges of one said opening provided in a second fastening member a predetermined distance, the horizontally disposed edge being engaged by the bottom edge of a connecting strap when the first and second fastening members are engaged with one another.

17. The process for joining the ends of two members together, each such member to be joined being defined by a planar inner surface and a linear end edge, the two members being provided in abutting engagement at their linear edges, said process comprising the following steps:

(a) providing on each of the members to be joined adjacent the linear edge thereof a plurality of spaced-apart first fastening members each being defined by a keeper which is spaced apart from the inner planar surface of a member to be joined and is defined by an inner planar surface in parallel disposition to the inner planar surface of the member to be joined whereby an opening is provided between the inner planar surface of the keeper and the opposing inner planar surface of a member to be joined, the keepers in the plurality of spaced-apart first fastening members being in such an alignment with one another that the openings provided by each of the fastening members are in alignment;

(b) providing a second fastening member to be operatively engaged with each of said plurality of first fastening members provided on the two members to be joined together, each said second fastening member comprising an opening of predetermined size and defining a peripheral edge, and an elongated member being provided in said opening which extends inwardly from the peripheral edge and is integral therewith;

(c) assembling the two members to be joined together so that the linear edges thereof are in abutting engagement with one another;

(d) placing the second fastening member in contact with the members to be joined together so that a first fastening member provided in the two members to be joined intrudes into an opening provided in a second fastening member; and (e) causing the second fastening member to be driven downwardly whereby the elongated members of the second fastening members intrude into the openings provided by the keeper in the first fastening members.

18. Process according to claim 17 wherein the keeper is provided integral with the member to be joined.

19. Process according to claim 18 wherein the second fastening member comprises two planar members joined together at a common edge and each said planar member extends outwardly from that edge at a predetermined angle with respect to one another.

20. Process according to claim 19 wherein the said planar members of the second fastening member are provided at a 90° angle with respect to one another.

* * * * *